(12) United States Patent
Hasegawa et al.

(10) Patent No.: US 9,787,181 B2
(45) Date of Patent: Oct. 10, 2017

(54) SENSOR DEVICE AND MONITORING SYSTEM

(71) Applicant: OMRON Corporation, Kyoto-shi, Kyoto (JP)

(72) Inventors: Teruki Hasegawa, Tokyo (JP); Hiroshi Imai, Kyoto (JP); Hiroshi Sameshima, Kyoto (JP); Tomohiro Ozaki, Tokyo (JP)

(73) Assignee: OMRON Corporation, Kyoto (JP)

( * ) Notice: Subject to any disclaimer, the term of this patent is extended or adjusted under 35 U.S.C. 154(b) by 143 days.

(21) Appl. No.: 14/781,051

(22) PCT Filed: Feb. 18, 2014

(86) PCT No.: PCT/JP2014/053772
§ 371 (c)(1),
(2) Date: Sep. 29, 2015

(87) PCT Pub. No.: WO2014/162786
PCT Pub. Date: Oct. 9, 2014

(65) Prior Publication Data
US 2016/0056718 A1    Feb. 25, 2016

(30) Foreign Application Priority Data

Apr. 2, 2013   (JP) ................................. 2013-077103

(51) Int. Cl.
*H02M 3/15*      (2006.01)
*H02M 3/156*    (2006.01)
(Continued)

(52) U.S. Cl.
CPC .............. *H02M 3/156* (2013.01); *G01H 1/00* (2013.01); *H02M 1/14* (2013.01); *H02J 7/0065* (2013.01); *H02M 2001/0032* (2013.01); *H02M 2001/0045* (2013.01); *Y02B 70/16* (2013.01)

(58) Field of Classification Search
CPC ........... H02M 1/14; H02M 3/156; G01H 1/00
See application file for complete search history.

(56) References Cited

U.S. PATENT DOCUMENTS 9,331,479 B2 *   5/2016   Imai ........................ G01D 3/10
2009/0058625 A1 *   3/2009   Suzuki .................. B60C 23/041
340/447

(Continued)

FOREIGN PATENT DOCUMENTS

JP           2005-253170 A       9/2005
JP           2006-081369 A       3/2006
(Continued)

OTHER PUBLICATIONS

Office Action in counterpart Korean Patent Application No. 2015-7030664 issued on Sep. 8, 2016 (11 pages).
(Continued)

*Primary Examiner* — Hezron E Williams
*Assistant Examiner* — David Z Huang
(74) *Attorney, Agent, or Firm* — Osha Liang LLP

(57) ABSTRACT

A sensor device includes a first sensor unit, a control IC configured to switch a power supply route, a power supply, a DC converter, and a regulator configured to regulate the voltage. A power supply route A and a power supply route B is provided as a power supply route from the power supply to the sensor unit and the control IC. In the power supply route A, the sensor unit is not electrically conducted to the power supply, and the control IC is directly connected to the power supply. In the power supply route B, the power supply, the DC converter, and the regulator are connected in series, output of the regulator is supplied to the sensor unit, and output of the DC converter is supplied to the control IC. The control IC switches between the power supply route A and the power supply route B according to an operating state of the sensor unit.

12 Claims, 7 Drawing Sheets

(51) Int. Cl.
    *H02M 1/14*    (2006.01)
    *G01H 1/00*    (2006.01)
    *H02J 7/00*    (2006.01)
    *H02M 1/00*    (2006.01)

(56) References Cited

U.S. PATENT DOCUMENTS

2011/0298545 A1* 12/2011 Morimoto ............. H03F 1/0216
                                                              330/296
2012/0081086 A1   4/2012 Van Dijk et al.
2013/0140910 A1   6/2013 Imai et al.

FOREIGN PATENT DOCUMENTS

| JP | 2007-089372 A | 4/2007 |
| JP | 2012-098809 A | 5/2012 |
| KR | 2008-0089852 A | 10/2008 |
| WO | 2009058138 A1 | 5/2009 |

OTHER PUBLICATIONS

International Search Report issued in corresponding application No. PCT/JP2014/053772 dated Apr. 1, 2014 (5 pages) (with English translation).
Written Opinion issued in corresponding application No. PCT/JP2014/053772 dated Apr. 1, 2014 (5 pages).
Extended European Search Report issued in corresponding European Application No. 14780269.8, dated Feb. 3, 2017 (9 pages).

* cited by examiner

Boosting converter output
(stepdown converter)

Output voltage waveform of DC converter 20

Regulator output

Output voltage waveform of regulator 30

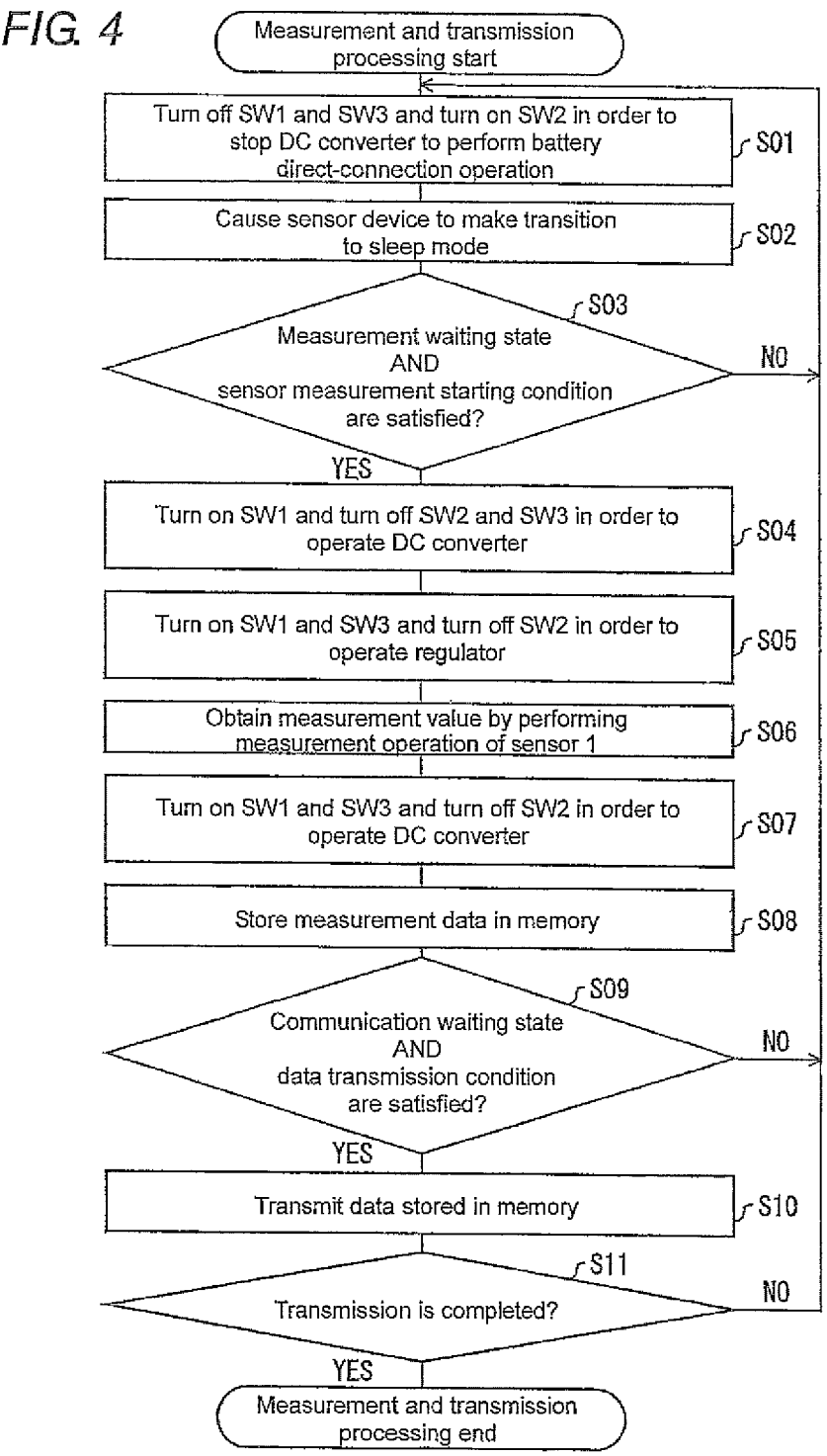

SENSOR DEVICE AND MONITORING SYSTEM

CROSS-REFERENCE TO RELATED APPLICATION

This application is based on Japanese Patent Application No. 2013-077103 filed with the Japan Patent Office on Apr. 2, 2013, the entire contents of which are incorporated herein by reference.

FIELD

The present invention relates to a sensor device and a monitoring system for measuring various measurement targets such as a temperature and humidity.

BACKGROUND

Various sensors are installed in our surrounding environment, measurement data of the sensor is transmitted to a server device (or a device main body), and the measurement data is analyzed in the server device. Machinery installed in the surrounding environment is controlled based on an analysis result.

Power consumption increases when the number of measure and data transmission times is increased in the sensor. For example, in the case that a sensor is operated by battery power, a life of the battery is shortened when the number of measure and data transmission times is increased, and it is necessary to frequently change the battery. For example, Unexamined Japanese Patent Publication No. 2012-98809 discloses a sensor device that can decrease the power consumption.

Specifically, the sensor device includes a sensor unit and a controller, plural power supply routes are provided from a power supply to the sensor unit and the controller, and the sensor device can switch between the power supply routes according to an operating state of the sensor unit. The power supply route is switched to a route in which the power is supplied through a DC converter in an operating mode in which current consumption becomes relatively large, and the power supply route is switched to a route in which the power supply is directly connected to a load to supply the power in the operating mode in which current consumption becomes relatively small.

SUMMARY

However, in the conventional technology, a voltage that varies due to a noise generated by switching of the DC converter is output from the DC converter to the sensor unit. There is a problem in that measurement accuracy of the sensor unit degrades by an influence of the variation in voltage. Particularly, the problem becomes prominent in the sensor unit that measures a minute change in physical amount. In the case that the battery is used as the power supply, there is a problem in that a battery voltage lowers with use of the sensor unit and the battery voltage varies. Additionally, there is a problem in that an internal voltage variation increases in the case that an electric storage device, such as a secondary battery and an electric double layer capacitor, in which external power is stored is used as the power supply.

The present invention is made in order to solve the problems described above, and an object of the present invention is to provide a sensor device and a monitoring system for being able to decrease the power consumption and to perform the high-accuracy measurement even if the operating state varies.

According to one aspect of the present invention, a sensor device includes: a first sensor unit configured to measure a measurement target; a controller configured to switch a power supply route; a power supply configured to supply power to the first sensor unit and the controller; a converter configured to convert a voltage; and a regulator configured to regulate the voltage. At this point, a power supply route A and a power supply route B are provided as the power supply route from the power supply to the first sensor unit and the controller, the first sensor unit being directly connected to the power supply or not being electrically conducted to the power supply and the controller being directly connected to the power supply in the power supply route A, the power supply, the converter, and the regulator being connected in series, output of the regulator being supplied to the first sensor unit, and output of the converter or the regulator being supplied to the controller in the power supply route B, and the controller switches between the power supply route A and the power supply route B according to an operating state of the first sensor unit.

The present invention has the effect that can decrease the power consumption and perform the high-accuracy measurement even if the operating state varies.

BRIEF DESCRIPTION OF THE DRAWINGS

FIG. 4 is a flowchart illustrating an example of a flow of measurement and transmission processing;

DETAILED DESCRIPTION (First Embodiment)

Figure 1:
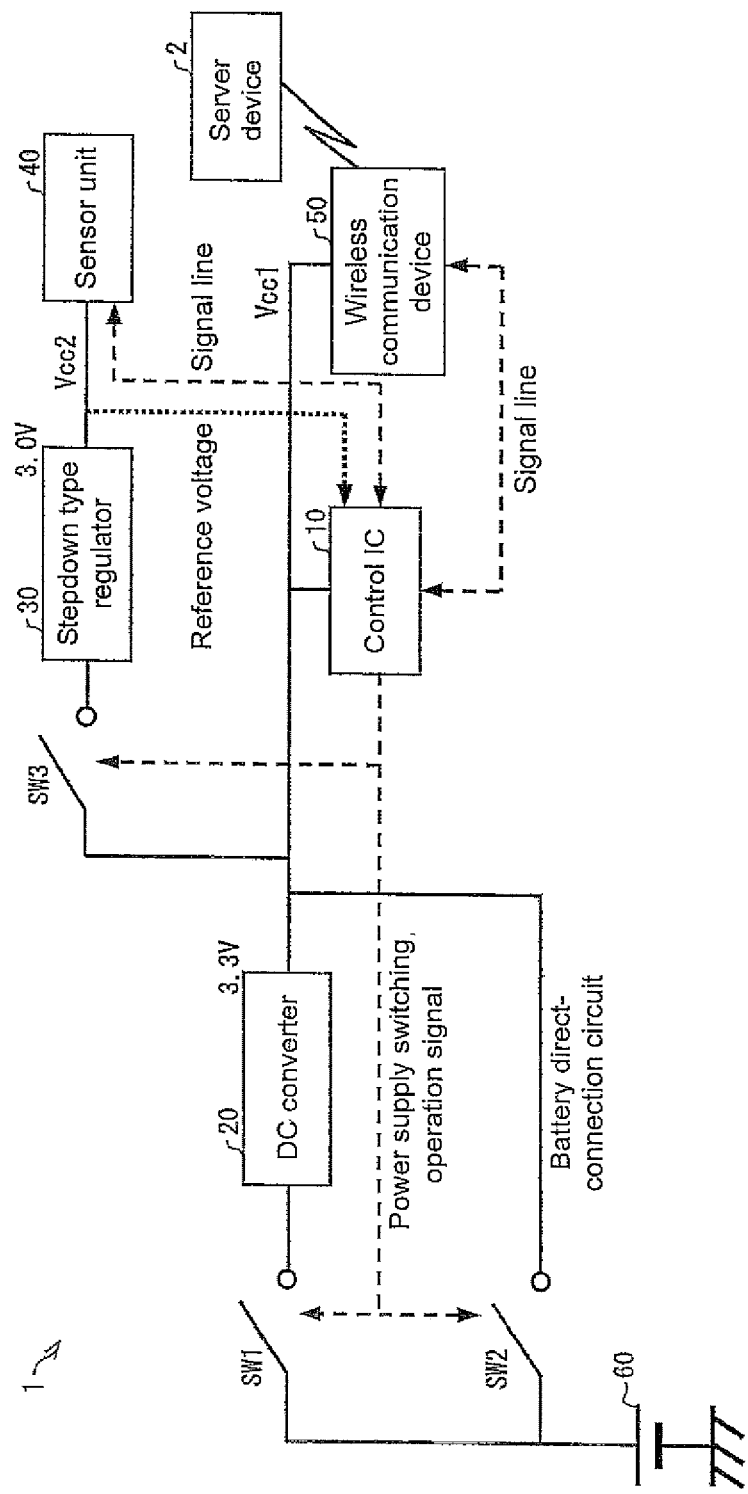
FIG. 1 is a block diagram illustrating an example of a sensor device according to a first embodiment of the present invention.

FIG. 1 is a block diagram illustrating an example of a sensor device according to a first embodiment of the present invention. A sensor device 1 in FIG. 1 is installed on various objects to measure surrounding physical amounts (such as acceleration, a displacement, a strain, a vibration frequency, a temperature, humidity, a pressure, an infrared amount, volume, illuminance, and a wind speed) of the objects. Particularly, the sensor device 1 of the first embodiment is suitable for measurement of the physical amount indicating a minute change, namely, high-accuracy measurement of the physical amount. A physical amount (such as the vibration frequency, the acceleration, and the displacement) associated with a vibration in a structure can be cited as an example of the physical amount indicating the minute change. Therefore, for example, the sensor device 1 of the first embodiment is installed in the structure, and suitable for the measurement of the physical amount associated with the vibration of the structure.

There is no particular limitation to a kind of the structure. For example, the sensor device 1 of the first embodiment can be applied to various structures such as a building, a bridge, a tunnel, a house, a vehicle, a plant facility, a pipeline, an electric cable, a telegraph pole, a gas supply facility, a water and sewerage facility, and a ruin.

As illustrated in FIG. 1, the sensor device 1 includes a control IC (controller) 10 that control the whole sensor device 1, a DC converter 20, a stepdown type regulator 30, a sensor unit (first sensor unit) 40, a wireless communication device (communicator) 50, a DC power supply 60, and switches SW1 to SW3.

An input line of the DC converter 20 is connected to the DC power supply 60 through the switch SW1. The DC converter 20 includes plural switching elements controlled by the control IC 10, and switching of the switching element is controlled to boost or step down a voltage at the DC power supply 60, thereby converting the voltage into a predetermined first voltage value. For example, the DC power supply 60 is a finite power supply source such as a battery. The wireless communication device 50 is connected to an output line of the DC converter 20, and the control IC 10 is connected to a connection line of the DC converter 20 and the wireless communication device 50. A primary battery or an electric storage device, such as a secondary battery and an electric double layer capacitor, in which external power is stored may be used as the battery.

Figure 5:
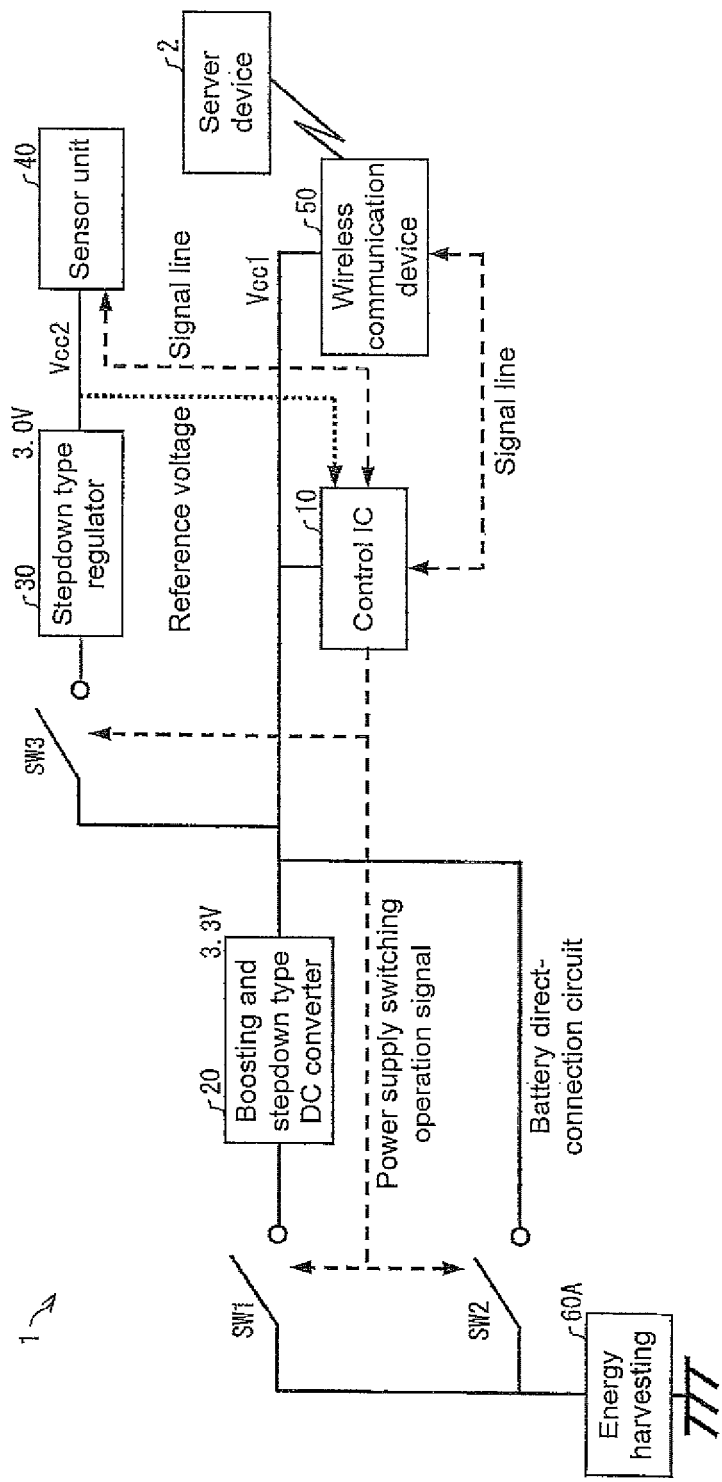
FIG. 5 is a block diagram illustrating an example of a sensor device having a form in which energy harvesting is used as a power supply.

The DC converter 20 may be one of a boosting type, a stepdown type, and a boosting and stepdown type. The boosting type, the stepdown type, and the boosting and stepdown type can properly be used according to the voltage at the power supply. For example, the boosting type is used in the case that the power supply has as low as about 2.4 V to about 3.0 V, the stepdown type is used in the case that the power supply has as high as about 4.5 V to about 6.0 V, and the boosting and stepdown type is used in the case that energy harvesting is used as the power supply as illustrated in FIG. 5. For example, the energy harvesting is obtained using solar light, a vibration, a temperature, an electromagnetic wave, and wind power. The output from the energy harvesting may be used as the DC power supply, or the output of the energy harvesting may temporarily be stored in the battery and used as the power supply.

The wireless communication device 50 communicates with a server device (receiver) 2 while being controlled by the control IC 10. Specifically, the wireless communication device 50 transmits measurement data generated by the sensor unit 40 to the server device 2.

In the switch SW2, one end is connected to the DC power supply 60, and the other end is connected to the DC converter 20 and the control IC 10. In the switch SW3, one end is connected to a power supply voltage line Vcc1, and the other end is connected to the regulator 30.

The regulator 30 regulates the input voltage to a predetermined voltage to stabilize the voltage. The regulator 30 is connected to the sensor unit 40. The regulator 30 regulates the voltage output from the DC converter 20 to a second voltage value lower than the first voltage value, and outputs the power having the second voltage value to the sensor unit 40.

For example, the sensor unit 40 is a temperature sensor, an acceleration sensor, a strain sensor, a pressure sensor, a humidity sensor, an infrared sensor, an acoustic sensor, or a vibration sensor. The sensor unit 40 measures a measurement target in response to an instruction from the control IC 10. The sensor unit 40 generates measurement data indicating a measurement result through the measurement, and outputs the generated measurement data to the control IC 10. The sensor unit 40 may be one of an analog sensor and a digital sensor. In the case that the sensor unit 40 is the analog sensor, the control IC 10 converts the measurement data into a digital signal with the voltage output from the regulator 30 as a reference voltage. Therefore, a voltage error between the sensor unit 40 and the control IC 10 can be eliminated during AC conversion.

The control IC 10 controls the switches SW1 to SW3 to switch the turn-on and -off according to a mode of the sensor device 1. The sensor device 1 has a sleep mode, a sensing mode, and a transmission mode.

In the sleep mode, the sensor unit 40 and the wireless communication device 50 are not operated. For the sleep mode, the control IC 10 turns on the switch SW2, and turns off the switches SW1 and SW3.

In the sensing mode, the sensor unit 40 is operated to perform sensing. For the sensing mode, the control IC 10 turns on the switches SW1 and SW3, and turns off the switch SW2.

In the transmission mode, the measurement data generated by the sensor unit 40 in the sensing mode is transmitted. For the transmission mode, the control IC 10 turns on the switch SW1, and turns off the switches SW2 and SW3.

The control IC 10 issues a measurement instruction to the sensor unit 40 when a measurement clock time comes. Specifically, when the measurement clock time is detected, the control IC 10 causes the sensor device 1 to make a transition from the sleep mode to the sensing mode to issue the measurement instruction to the sensor unit 40. The measurement clock time is a clock time a predetermined time elapses since the previous measurement clock time, and the control IC 10 times the measurement clock time.

When obtaining the measurement data generated by the sensor unit 40 through the measurement in the sensing mode, the control IC 10 stores the obtained measurement data in a memory (not illustrated). When obtaining the measurement data generated by the sensor unit 40 through the measurement, the control IC 10 causes the sensor device 1 to make a transition from the sensing mode to the transmission mode, and controls the wireless communication device 50 to transmit the measurement data stored in the memory to the server device 2.

Specifically, when making the transition to the transmission mode, the control IC 10 issues an instruction to the wireless communication device 50 to establish communication with the server device 2. Therefore, in response to the instruction, the wireless communication device 50 establishes the communication with the server device 2. When establishing the communication with the server device 2, the wireless communication device 50 outputs a signal indicating the establishment of the communication with the server device 2 to the control IC 10. Therefore, in response to the signal, the control IC 10 transmits the measurement data stored in the memory to the wireless communication device 50. On the other hand, in the case that the wireless communication device 50 does not establish the communication with the server device 2, the wireless communication device 50 outputs a signal indicating that the wireless communication device 50 does not establish the communication with the server device 2 to the control IC 10. Therefore, in response to the signal, the control IC 10 causes the sensor device 1 to make the transition from the transmission mode to the sleep mode. When the wireless communication device 50 notifies the control IC 10 that the measurement data is transmitted, the control IC 10 causes the sensor device 1 to make the transition from the transmission mode to the sleep mode.

Figure 2:
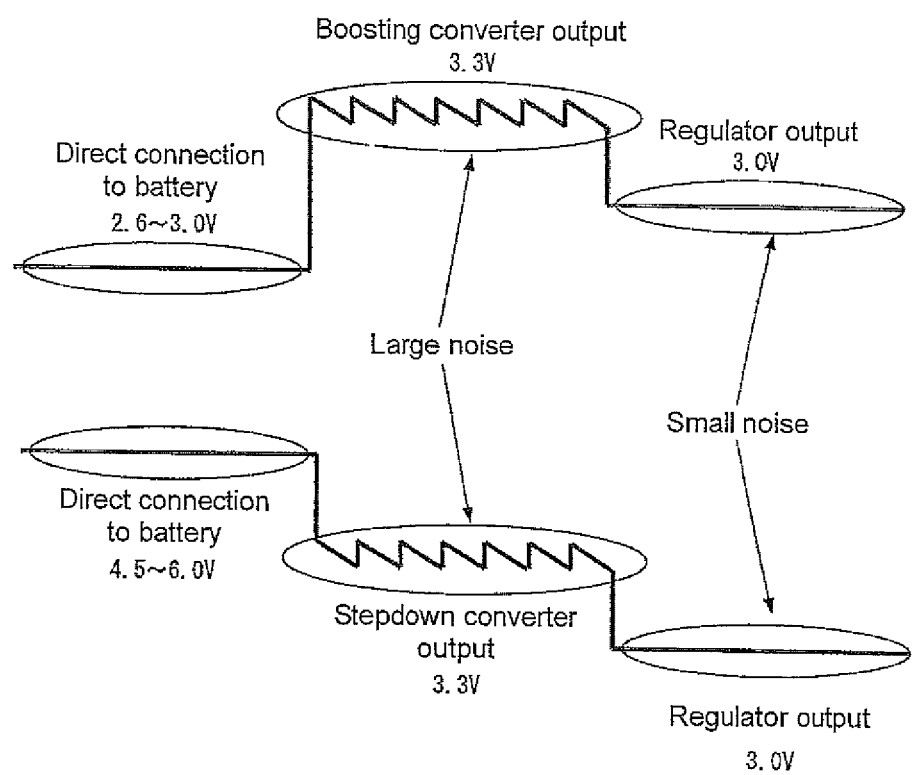
FIG. 2 is a conceptual drawing illustrating waveforms of output voltages of a DC converter and a regulator.
Figure 3A:
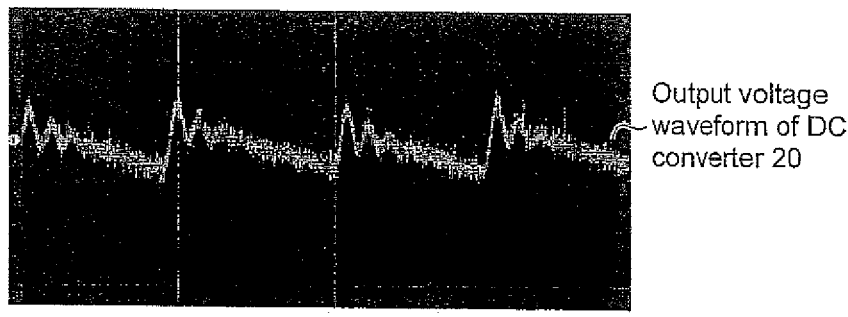
FIGS. 3(a) and 3(b) are views illustrating measurement results of the output voltages of the DC converter and the regulator.

As described above, in the sensing mode, after the DC converter 20 converts the voltage into the voltage having the first voltage value, the regulator 30 regulates the first voltage value to the second voltage value, and supplies the power having the second voltage value to the sensor unit 40. Therefore, for example, as illustrated in FIG. 2, the battery voltage is converted into 3.3 V by the DC converter 20 in a power line in which the battery that is of the DC power supply 60, the DC converter (the boosting type or stepdown type) 20, and the regulator 30 are connected in series. At this point, an output voltage varies due to the conversion of the DC converter 20. FIG. 3(a) illustrates a measurement result of the actual output voltage of the DC converter (stepdown type) 20. As is clear from FIG. 3(a), the output voltage varies.

Figure 3B:
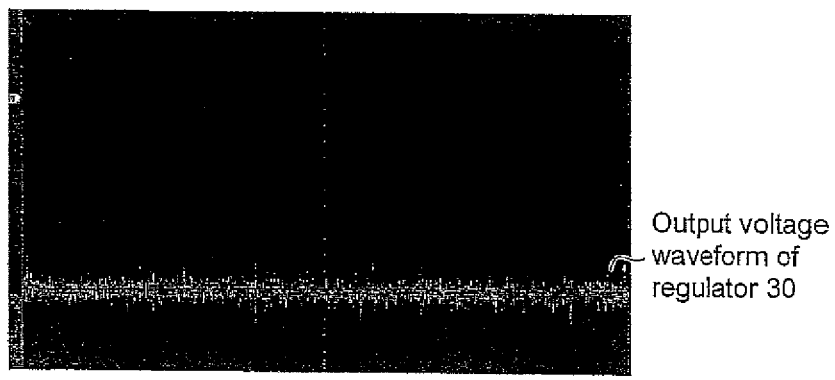

The output voltage converted by the DC converter 20 is regulated by the regulator 30 to obtain a constant voltage of 3.0 V. Therefore, the constant voltage can be output with no voltage variation. FIG. 3(b) illustrates a measurement result of the actual output voltage of the regulator 30. As is clear from FIG. 3(b), the output voltage is stable. The stable voltage having little voltage variation is supplied to the sensor unit 40. Therefore, the sensor unit 40 can perform the measurement with high accuracy. In the case that the DC converter 20 is the boosting and stepdown type, even if the output voltage varies using the energy harvesting as the DC power supply 60, the DC converter 20 performs stepdown to output the voltage having the first voltage value when the output voltage from the DC power supply 60 is greater than or equal to a predetermined value (for example, 3.3 V), and the DC converter 20 performs boosting to output the voltage having the first voltage value when the output voltage from the DC power supply 60 is less than the predetermined value, so that a constant voltage can efficiently be output. Accordingly, the measurement can efficiently and accurately be performed.

In the sleep mode, power consumption is decreased because necessity to operate the sensor unit 40 and the wireless communication device 50 is eliminated. The DC converter 20 and the regulator 30 are stopped, so that the power consumption can be decreased.

In the transmission mode, the power is not supplied to the sensor unit 40 and the regulator 30, so that the power consumption of the sensor unit 40 and the regulator 30 can be decreased.

Accordingly, the sensor device 1 is caused to make the transition to the sleep mode in the case that the necessity for the measurement and the transmission of the measurement data is eliminated, the sensor device 1 is caused to make the transition to the sensing mode in the case of the measurement, and the sensor device 1 is caused to make the transition to the transmission mode in the case that the measurement data is transmitted, which allows the DC power supply 60 to be efficiently used.

FIG. 4 is a flowchart illustrating an example of a flow of measurement and transmission processing. The control IC 10 executes a measurement and transmission program, whereby the control IC 10 performs the measurement and transmission processing. The control IC 10 turns off the switches SW1 to SW3 (Step S01). Therefore, the DC converter 20 is stopped, and the power is directly supplied from the DC power supply 60 to the control IC 10 and the wireless communication device 50.

In Step S02, the control IC 10 causes the sensor device 1 to make the transition to the sleep mode. The control IC 10 determines whether a measurement waiting state and a measurement starting condition are satisfied (Step S03). The processing goes to Step S04 when the measurement waiting state and the measurement starting condition are satisfied, and the processing returns to Step S02 when the measurement waiting state and the measurement starting condition are not satisfied.

In Step S04, the control IC 10 turns on the switch SW1, and turns off the switches SW2 and SW3. Therefore, the DC converter 20 is operated to supply the power to the control IC 10 and the wireless communication device 50.

In Step 05, the control IC 10 turns on the switches SW1 and SW3, and turns off the switch SW2. Therefore, the regulator 30 is operated to supply the power to the sensor unit 40 in addition to the control IC 10 and the wireless communication device 50. At this point, because the power converted and output by the DC converter 20 is regulated by the regulator 30, the stable power having little voltage variation is supplied to the sensor unit 40. This enables the performance of the high-accuracy measurement.

In Step S06, the control IC 10 obtains the measurement data generated through the measurement in Step S05 by the sensor unit 40. The control IC 10 turns on the switch SW1, and turns off the switches SW2 and SW3 (Step S07). The measurement data obtained in Step S06 is stored in the memory (Step S08).

In Step 09, the control IC 10 determines whether a communication waiting state and a data transmission condition are satisfied. The processing goes to Step S10 when the communication waiting state and the data transmission condition are satisfied, and the processing returns to Step S01 when the communication waiting state and the data transmission condition are not satisfied.

In Step S10, the control IC 10 controls the wireless communication device 50 to transmit the measurement data stored in the memory to the server device 2. The control IC 10 determines whether the transmission is completed (Step S11). The measurement and transmission processing is ended when the transmission is completed, and the processing returns to Step S01 when the transmission is not completed.

As described above, the sensor device 1 of the first embodiment includes the sensor unit 40 that measures the measurement target, the control IC 10 that switches a power supply route, the DC power supply 60 that supplies the power to the sensor unit 40 and the control IC 10, the DC converter 20 that converts the power, the regulator 30 that regulates the power, and the wireless communication device 50 that transmits the measurement data of the sensor unit 40. At this point, a power supply route A, a power supply route B, and a power supply route C are provided as the power supply route from the DC power supply 60 to the sensor unit 40 and the control IC 10, the sensor unit 40 being not electrically conducted to the DC power supply 60 and the control IC 10 and the wireless communication device 50 being directly connected to the DC power supply 60 in the power supply route A, the DC power supply 60, the DC converter 20, and the regulator 30 being connected in series, the output of the regulator 30 being supplied to the sensor unit 40, and the output of the DC converter 20 being supplied to the control IC 10 and the wireless communication device 50 in the power supply route B, the DC power supply 60 and the DC converter 20 being connected to each other, the output of the DC converter 20 being supplied to the control IC 10 and the wireless communication device 50, and the sensor unit 40 being not electrically conducted to the DC power supply 60 in the power supply route C, and the control IC 10 switches among the power supply route A, the power supply route B, and the power supply route C according to an operating state of the sensor unit 40 or the wireless communication device 50.

The power supply route is switched according to the operating state of the sensor unit 40, so that the optimum power supply route can be selected to achieve the low power consumption. Because the voltage, which is converted by the DC converter 20 and has a large voltage variation, is regulated to a constant voltage by the regulator 30 when the power supply route is switched to the power supply route B, the stable power having little voltage variation is supplied to the sensor unit 40. Accordingly, even if the operating state is varied according to an installation environment and the like, the decrease in power consumption and the high-accuracy measurement can be achieved.

(Second Embodiment)

Figure 6:
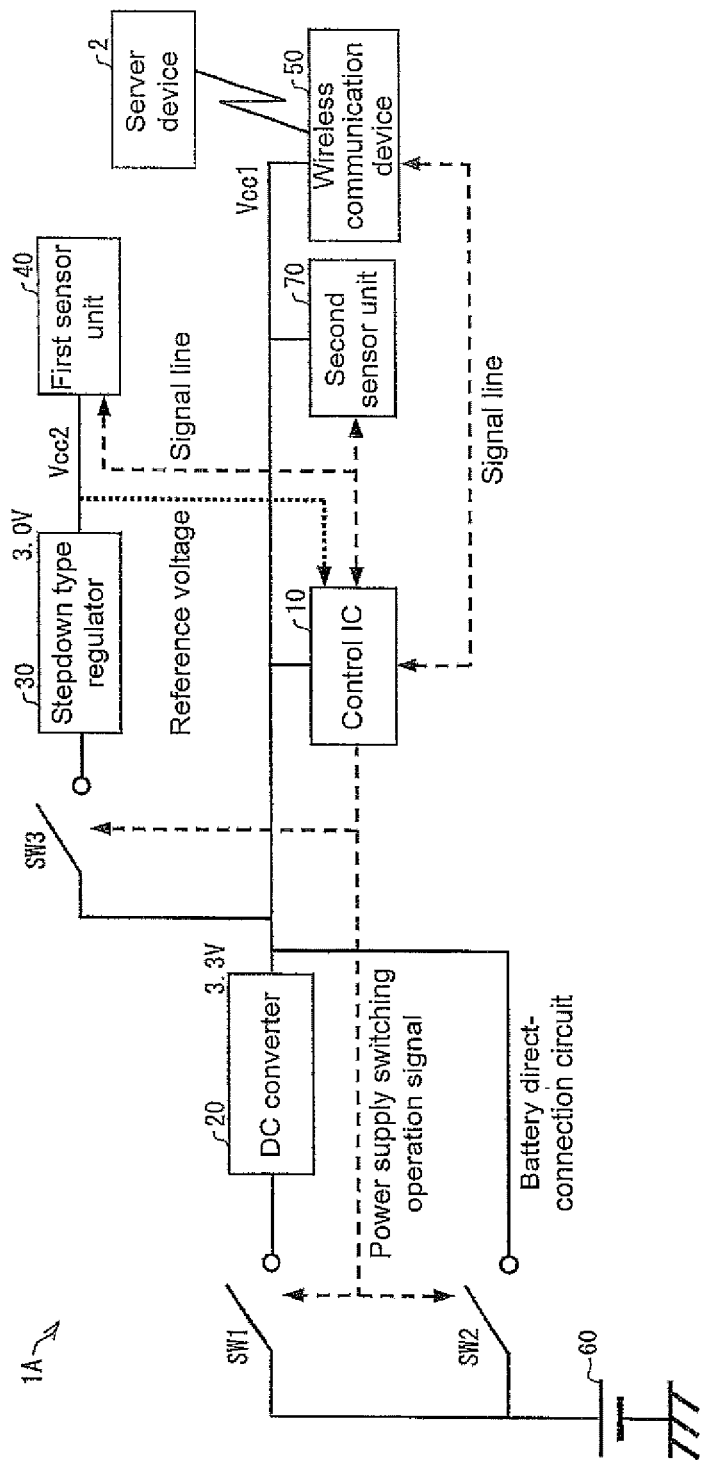
FIG. 6 is a block diagram illustrating an example of a sensor device according to a second embodiment.

FIG. 6 is a block diagram illustrating an example of a sensor device according to a second embodiment. A sensor device 1A in FIG. 6 differs from the sensor device 1 in that a second sensor unit 70 is added. Because other configurations are similar to those of the sensor device 1, a point different from the sensor device 1 will mainly be described. The first sensor unit 40 corresponds to the sensor unit 40 in FIG. 1.

The second sensor unit 70 is controlled by the control IC 10, and connected to the power supply voltage line Vcc1 connecting the control IC 10 and the wireless communication device 50. Therefore, the power output from the DC converter 20 is supplied in the sensing mode. The power having the voltage variation larger than that of the first sensor unit 40 is supplied to the second sensor unit 70, and is used to measure the measurement target in which the high-accuracy measurement is not required. For example, the second sensor unit 70 is a temperature sensor, an acceleration sensor, a strain sensor, a pressure sensor, a humidity sensor, an infrared sensor, an acoustic sensor, or a vibration sensor.

(Third Embodiment)

Figure 7:
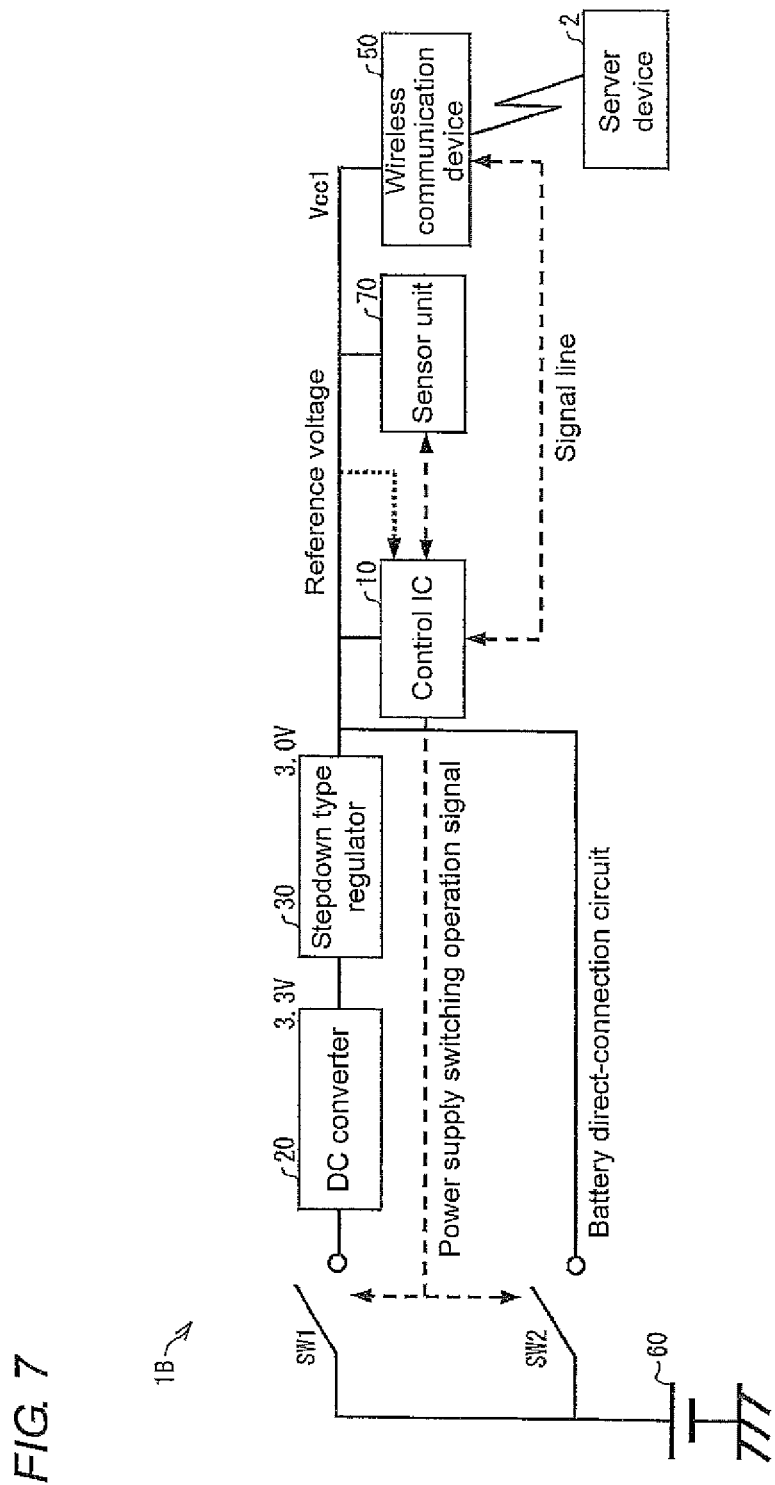
FIG. 7 is a block diagram illustrating an example of a sensor device according to a third embodiment.

FIG. 7 is a block diagram illustrating an example of a sensor device according to a third embodiment. As illustrated in FIG. 7, similarly to the sensor device 1, a sensor device 1B includes the control IC 10, the DC converter 20, the regulator 30, the sensor unit 40, the wireless communication device 50, the DC power supply 60, and the switches SW1 and SW2.

The input line of the DC converter 20 is connected to the DC power supply 60 through the switch SW1, and the regulator 30 is connected to the output line of the DC converter 20. The control IC 10, the sensor unit 40, and the wireless communication device 50 are connected in series to the output line of the regulator 30. The switch SW2 is connected in parallel to the DC converter 20, the regulator 30, and the switch SW1.

The control IC 10 switches the turn-on and -off of the switches SW1 and SW2 according to a mode of the sensor device 1B. Specifically, in the sleep mode, the control IC 10 turns off the switch SW1, and turns on the switch SW2. In the sensing and transmission modes, the control IC 10 turns on the switch SW1, and turns off the switch SW2.

In the third embodiment, the battery is used as the DC power supply 60 by way of example. However, the DC power supply 60 is not limited to the battery. The battery contributes largely to a lengthened life of the DC power supply 60. However, the effect that decreases the power consumption is obtained in the present invention unless the DC power supply 60 is the finite power supply source.

(Implementation Example by Software)

The control blocks (particularly, the control IC 10) of the sensor devices 1, 1A, and 1B may be constructed with a logic circuit (hardware) formed in an integrated circuit (IC chip), or implemented by software using the CPU (Central Processing Unit).

In the latter case, the sensor devices 1, 1A, and 1B include the CPU that executes a command of the program that is of software implementing each function, the ROM (Read Only Memory) or storage device (referred to as a "recording medium") in which the program and various pieces of data are readably stored through the computer (or the CPU), and the RAM (Random Access Memory) in which the program is expanded. The computer (or the CPU) reads the program from the recording medium to execute the program, thereby achieving the object of the present invention. A "non-transient physical medium" such as a tape, a disk, a card, a semiconductor memory, and a programmable logic circuit can be used as the recording medium. The program may be supplied to the computer through any transmission medium, such as a communication network and a broadcasting wave, which can transmit the program. The present invention can be implemented even in a mode of a data signal. The data signal is embedded in a carrier wave, and the program is provided by electronic transmission in the data signal.

(Summary)

As described above, the sensor device of the present invention includes: the first sensor unit configured to measure the measurement target; the controller that switches the power supply route; the power supply that supplies the power to the first sensor unit and the controller; the converter that converts the voltage; and the regulator that regulates the voltage. At this point, the power supply route A and the power supply route B are provided as the power supply route from the power supply to the first sensor unit and the controller, the first sensor unit being directly connected to the power supply or not being electrically conducted to the power supply and the controller being directly connected to the power supply in the power supply route A, the power supply, the converter, and the regulator being connected in series, output of the regulator being supplied to the first sensor unit, and output of the converter or the regulator being supplied to the controller in the power supply route B, and the controller switches between the power supply route A and the power supply route B according to the operating state of the first sensor unit.

In the above configuration, the power supply route is switched according to the operating state of the first sensor unit, so that the optimum power supply route can be selected to achieve the low power consumption. For example, the power supply route A may be selected in the waiting mode in which the first sensor unit does not perform the measurement operation, and the power supply route B may be selected in the sensing mode in which the first sensor unit performs the measurement operation. A small amount of power is consumed by the controller in the waiting mode, so that the power consumption of the converter can be decreased by directly connecting the power supply to the controller. On the other hand, a large amount of power is consumed by the first sensor unit in the sensing mode, so that the converter can be driven with large current conversion efficiency by connecting the power supply to the first sensor unit and the controller through the converter.

Because the voltage, which is converted by the converter and has the large voltage variation, is regulated to a constant voltage by the regulator when the power supply route is switched to the power supply route B, the stable power having little voltage variation is supplied to the first sensor unit.

Therefore, the first sensor unit can perform the measurement with high accuracy. Accordingly, the present invention can provide the sensor device that can decrease the power consumption and perform the high-accuracy measurement even if the operating state is varied.

The sensor device of the present invention further includes the communicator that transmits the measurement data of the first sensor unit. At this point, the communicator is directly connected to the power supply or not electrically conducted to the power supply in the power supply route A, the output of the converter is supplied to the communicator and the controller in the power supply route B, the power supply route C is provided as the power supply route in addition to the power supply route A and the power supply route B, the power supply and the converter being connected to each other, the output of the converter being supplied to the controller and the communicator, the first sensor unit being not electrically conducted to the power supply in the power supply route C, and the controller switches among the power supply route A, the power supply route B, and the power supply route C according to the operating state of the first sensor unit or the communicator.

In the above configuration, the power supply route C may be selected in the transmission mode in which the communicator transmits the measurement data. Although a relatively large amount of power is required when the communicator transmits the measurement data, the converter can be driven with large current conversion efficiency because the power is supplied to the communicator through the converter. At this point, the regulator is driven, so that the operation power of the regulator can be decreased.

The sensor device of the present invention further includes a second sensor unit that measures a measurement target. At this point, the second sensor unit is directly connected to the power supply in the power supply route A, the output of the converter is supplied to the controller, the communicator, and the second sensor unit in the power supply route B, and the output of the converter is supplied to the second sensor unit in the power supply route C.

In the above configuration, the power having the voltage variation larger than that of the first sensor unit is supplied to the second sensor unit, so that the power can be used to measure the measurement target in which the high-accuracy measurement is not required. Accordingly, the first sensor unit and the second sensor unit can properly be used according to the measurement target in which the high-accuracy measurement is required and the measurement target in which the high-accuracy measurement is not required.

The sensor device of the present invention further includes the communicator that transmits the measurement data of the first sensor unit. At this point, the communicator and the first sensor unit are directly connected to the power supply in the power supply route A, and the output of the regulator is supplied to the controller and the communicator in the power supply route B.

In the sensor device of the present invention, the communicator can wirelessly transmit the measurement data.

For example, the converter is the boosting type converter or the stepdown type converter. The converter may be the boosting and stepdown type converter that performs the stepdown when the voltage at the power supply is greater than or equal to a predetermined value and performs the boosting when the voltage at the power supply is less than the predetermined value.

In the sensor device of the present invention, the power obtained by the energy harvesting can be used as the power supply, or the battery can be used as the power supply.

In the sensor device of the present invention, the first sensor unit is a sensor that outputs an analog signal, and the controller compares the analog signal output from the first sensor unit to the reference voltage using an output voltage of the regulator as the reference voltage, and outputs the digital measurement value of the measurement target.

In the above configuration, the voltage at the controller differs from the voltage at the first sensor unit, and the controller uses the output voltage of the regulator as the reference voltage when the analog signal output from the first sensor unit is converted into the digital signal, which allows the voltage error to be eliminated.

In the sensor device of the present invention, the sensor device is mounted on the structure, and the first sensor unit measures the vibration of the structure.

In the above configuration, the vibration generated in the structure can accurately be measured.

To solve the problems described above, a monitoring system of the present invention includes: the sensor device; and a receiver that receives the measurement data of the first sensor unit included in the sensor device from the sensor device.

In the above configuration, the present invention can provide the monitoring system that can decrease the power consumption and perform the high-accuracy measurement even if the operating state is varied according to the installation environment and the like.

The sensor device of each embodiment of the present invention may be constructed with a computer. In this case, a control program that operates the computer as each unit of the sensor device to construct the sensor device and a computer-readable recording medium in which the control program is recorded are also included in the scope of the present invention.

The present invention is not limited to the embodiments, but various changes can be made without departing from the scope recited in the claims. It is noted that the embodiment obtained by a combination of different embodiments is also included in the technical scope of the present invention.

The invention claimed is:
1. A sensor device comprising:
a first sensor unit configured to measure a measurement target;
a controller configured to switch a power supply route;
a power supply configured to supply power to the first sensor unit and the controller;
a converter configured to convert a voltage
a regulator configured to regulate the voltage; and
a communicator configured to transmit measurement data of the first sensor unit,
wherein a power supply route A, a power supply route B, and a power supply route C are provided as the power supply routes from the power supply to the first sensor unit and the controller,
the first sensor unit being directly connected to the power supply or not being electrically conducted to the power supply and the controller being directly connected to the power supply in the power supply route A,
the power supply, the converter, and the regulator being connected in series, output of the regulator being sup- plied to the first sensor unit, and output of the converter or the regulator being supplied to the controller in the power supply route B, the power supply and the converter being connected to each other, the output of the converter being supplied to the controller and the communicator, the first sensor unit being not electrically conducted to the power supply in the power supply route C, and the controller switches among the power supply route A, the power supply route B, and the power supply route C according to an operating state of the first sensor unit or the communicator.

2. The sensor device according to claim 1,
wherein the communicator is directly connected to the power supply in the power supply route A, the output of the converter is supplied to the communicator and the controller in the power supply route B.

3. The sensor device according to claim 2, further comprising a second sensor unit configured to measure a measurement target,
wherein the second sensor unit is directly connected to the power supply in the power supply route A,
the output of the converter is supplied to the controller, the communicator, and the second sensor unit in the power supply route B, and
the output of the converter is supplied to the second sensor unit in the power supply route C.

4. The sensor device according to claim 2, wherein the communicator wirelessly transmits the measurement data.

5. The sensor device according to claim 1, wherein the converter is a boosting type converter.

6. The sensor device according to claim 1, wherein the converter is a stepdown type converter.

7. The sensor device according to claim 1, wherein the converter is a boosting and stepdown type converter configured to perform stepdown when the voltage at the power supply is greater than or equal to a predetermined value and to perform boosting when the voltage at the power supply is less than the predetermined value.

8. The sensor device according to claim 1, wherein power obtained by energy harvesting is used as the power supply.

9. The sensor device according to claim 1, wherein a battery is used as the power supply.

10. The sensor device according to claims 1, wherein the first sensor unit is a sensor configured to output an analog signal, and
the controller compares the analog signal output from the first sensor unit to a reference voltage using an output voltage of the regulator as the reference voltage, and outputs a digital measurement value of the measurement target.

11. The sensor device according to claim 1, wherein the sensor device is mounted on a structure, and the first sensor unit measures a vibration of the structure.

12. A monitoring system comprising:
the sensor device according to claim 1; and
a receiver configured to receive measurement data of the first sensor unit included in the sensor device from the sensor device.

* * * * *